(12) United States Patent
Zhang et al.

(10) Patent No.: US 9,983,367 B2
(45) Date of Patent: May 29, 2018

(54) OPTICAL MODULE AND METHOD OF MAKING OPTICAL MODULE

(71) Applicants: FUJITSU COMPONENT LIMITED, Tokyo (JP); FUJITSU LIMITED, Kawasaki-shi, Kanagawa (JP)

(72) Inventors: Hongfei Zhang, Tokyo (JP); Osamu Daikuhara, Tokyo (JP); Hidenobu Muranaka, Kawasaki (JP)

(73) Assignees: FUJITSU COMPONENT LIMITED, Tokyo (JP); FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/262,099

(22) Filed: Sep. 12, 2016

(65) Prior Publication Data

US 2017/0090131 A1 Mar. 30, 2017

(30) Foreign Application Priority Data

Sep. 24, 2015 (JP) ................................. 2015-187410

(51) Int. Cl.
| | |
|---|---|
| G02B 6/36 | (2006.01) |
| G02B 6/42 | (2006.01) |
| G02B 6/32 | (2006.01) |
| G02B 6/38 | (2006.01) |

(52) U.S. Cl.
CPC .............. *G02B 6/4214* (2013.01); *G02B 6/32* (2013.01); *G02B 6/4269* (2013.01); *G02B 6/4292* (2013.01); *G02B 6/3849* (2013.01); *G02B 6/3885* (2013.01); *G02B 6/423* (2013.01); *G02B 6/4206* (2013.01); *G02B 6/4255* (2013.01)

(58) Field of Classification Search
USPC ........................................................... 385/31
See application file for complete search history.

(56) References Cited

U.S. PATENT DOCUMENTS

| | | | | |
|---|---|---|---|---|
| 7,441,965 | B2 | 10/2008 | Furuno et al. | |
| 7,665,911 | B2 | 2/2010 | Hamazaki | |
| 2010/0232746 | A1* | 9/2010 | Hino | G02B 6/4201 |
| | | | | 385/31 |
| 2014/0153881 | A1* | 6/2014 | Liff | G02B 6/4214 |
| | | | | 385/89 |
| 2014/0178012 | A1* | 6/2014 | Chang | G02B 6/3853 |
| | | | | 385/79 |

FOREIGN PATENT DOCUMENTS

| | | |
|---|---|---|
| JP | 2006-309113 | 11/2006 |
| JP | 2009-020426 | 1/2009 |

OTHER PUBLICATIONS

Omron, "Multimode Micro Lens Array," [online], Searched on Sep. 18, 2015, the Internet (URL:https://echannel.omron247.com/marcom/pdfcatal.nsf/26d51fcb808d916986256f7e00791221/43f35572df44877886256fb300587440/$FILE/D39P1L0205.pdf).

* cited by examiner

*Primary Examiner* — Eric Wong
(74) *Attorney, Agent, or Firm* — IPUSA, PLLC

(57) ABSTRACT

An optical module for connecting between an optical fiber and a photoelectric conversion device mounted on a printed circuit board includes a main body made of transmissive material and having a slanted face and a bottom face, the slanted face being at an angle to the bottom face, a reception-purpose lens, and a transmission-purpose lens, wherein the slanted face serves as a mirror on an optical path extending in the main body between the reception-purpose lens and the transmission-purpose lens.

5 Claims, 10 Drawing Sheets

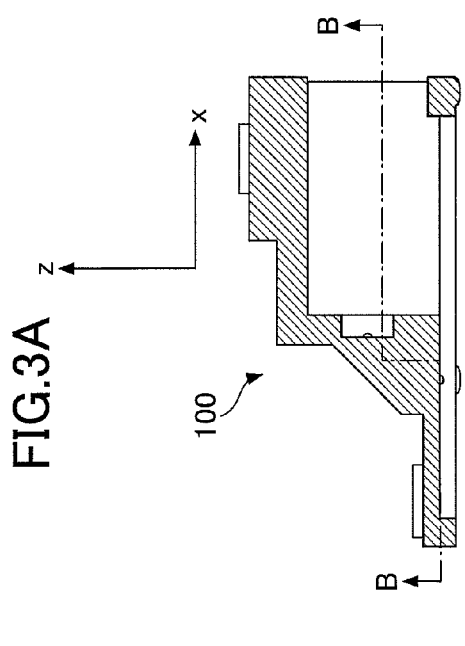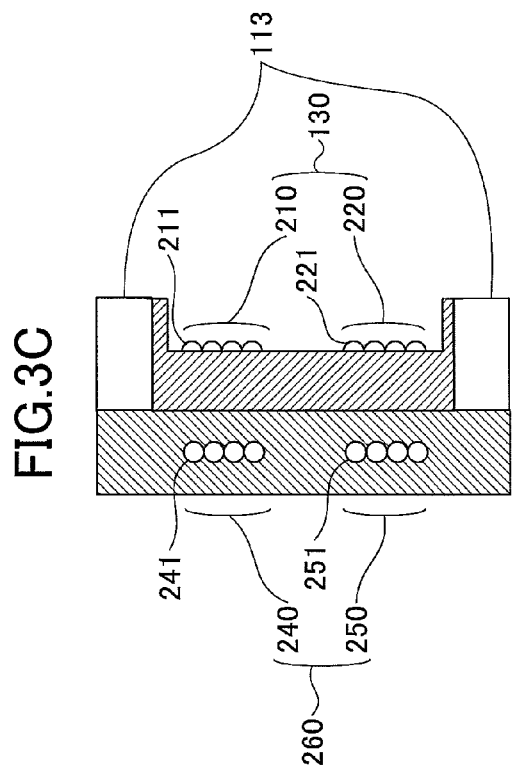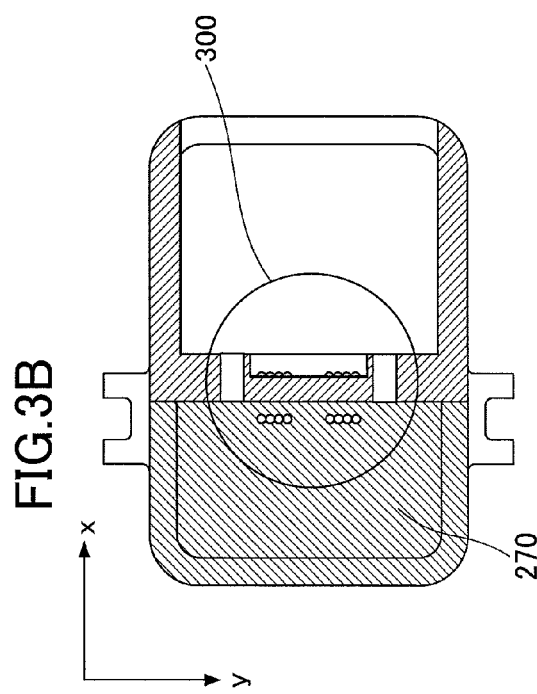

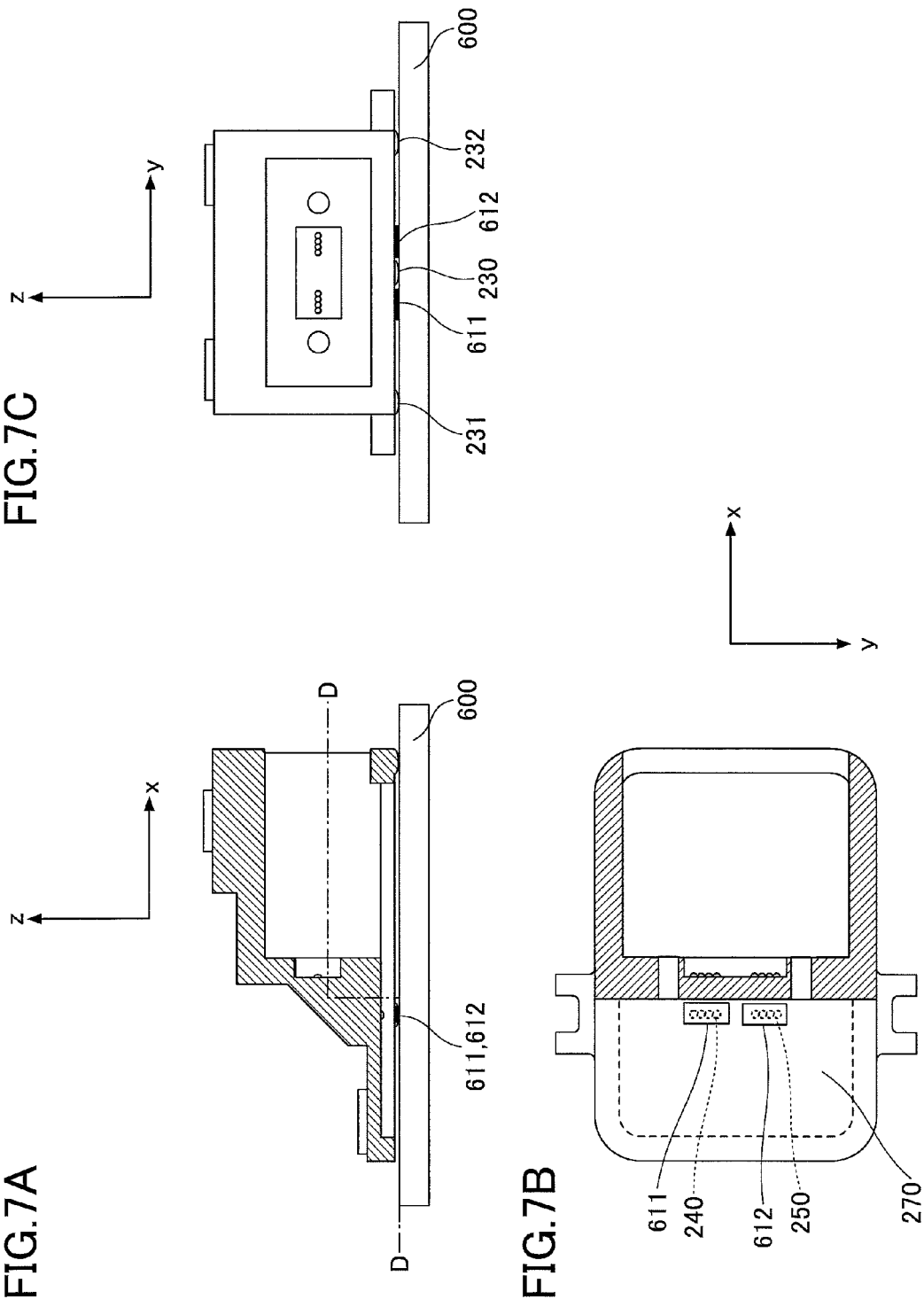

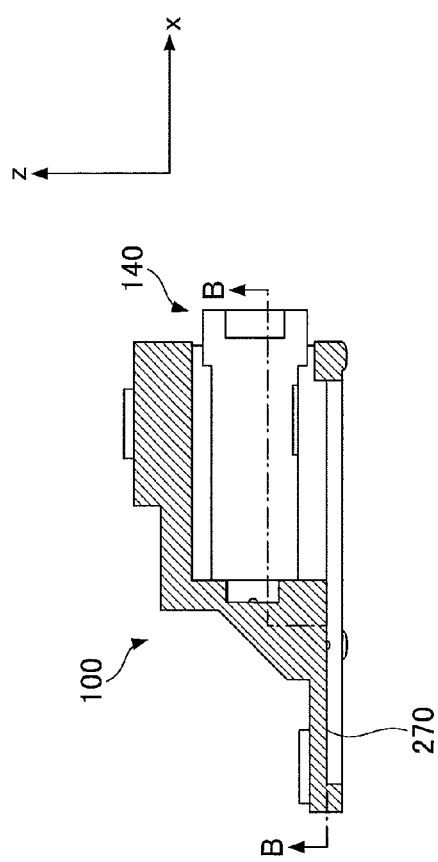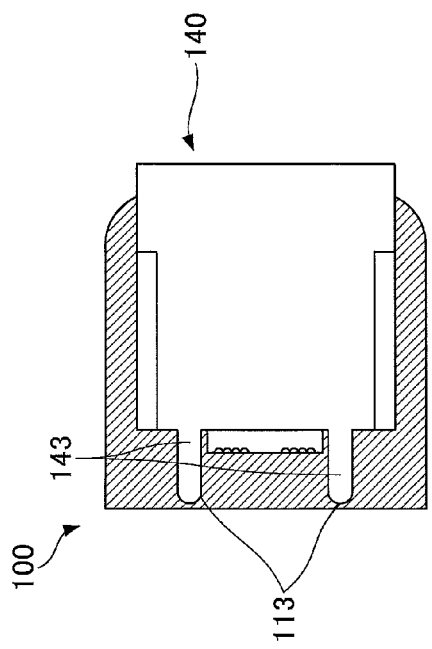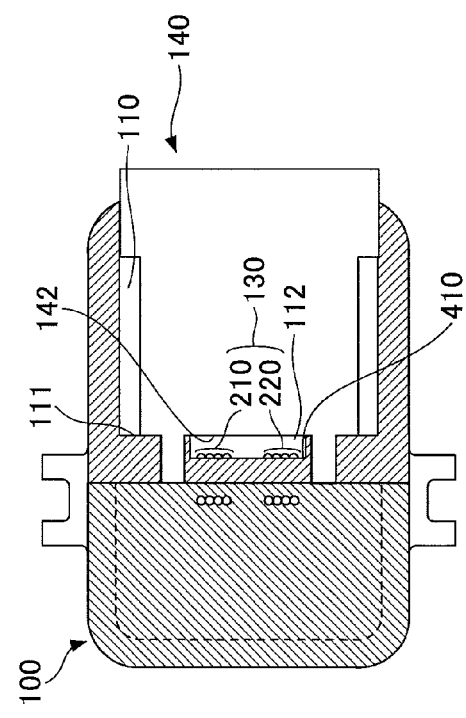

OPTICAL MODULE AND METHOD OF MAKING OPTICAL MODULE

BACKGROUND OF THE INVENTION

1. Field of the Invention

The disclosures herein relate to an optical module and a method of making the optical module.

2. Description of the Related Art

Advancement in the technology of high-speed, high-volume communication networks and communication control equipment has prompted the wide-spread use of optical fibers for communication and transmission purposes. Generally, an optical transceiver for conversion between an electrical signal and an optical signal is used at the connection point between an optical fiber and a device. Such an optical transceiver has an optical module providing an optical waveguide between an optical fiber and a photoelectric conversion device.

Conventional optical modules are comprised of a large number of components, which requires a large number of production steps at the time of assembly, thereby giving rise to the problem of excessive production steps. In the case of Patent Documents 1 and 2, the forming of an optical waveguide involves such steps as filling a groove with core material for an optical fiber and pasting an overclad film on the core material in the groove. Further, an additional step such as the UV (ultraviolet) curing of the pasted overclad film is involved.

Against this background, it is required for an optical module used in an optical transceiver that the number of components is reduced and that the production steps are simplified.

Accordingly, it may be desirable to reduce production steps for making an optical module.

[Patent Document 1] Japanese Laid-open Patent Publication No. 2009-20426

[Patent Document 2] Japanese Laid-open Patent Publication No. 2006-309113

[Non-Patent Document 1] "Multimode Micro Lens Array," [online], Searched on Sep. 18, 2015, the Internet (URL: https://echannel.omron247.com/marcom/pdfcatal.n sf/26d51fcb808d916986256f7e00791221/ 43f35572df448778 86256fb300587440/$FILE/ D39P1L0205.pdf)

SUMMARY OF THE INVENTION

It is a general object of the present invention to provide an optical module that substantially obviates one or more problems caused by the limitations and disadvantages of the related art.

According to an embodiment, an optical module for connecting between an optical fiber and a photoelectric conversion device mounted on a printed circuit board includes a main body made of transmissive material and having a slanted face and a bottom face, the slanted face being at an angle to the bottom face, a reception-purpose lens, and a transmission-purpose lens, wherein the slanted face serves as a mirror on an optical path extending in the main body between the reception-purpose lens and the transmission-purpose lens.

According to an embodiment, a method of making an optical module for connecting between an optical fiber and a photoelectric conversion device mounted on a printed circuit board includes forming, by injection molding of transmissive material, a seamless structure including a reception-purpose lens, a transmission-purpose lens, and a main body having a slanted face situated at an angle to a bottom face of the main body, and arranging for the slanted face to serve as a mirror on an optical path extending in the main body between the reception-purpose lens and the transmission-purpose lens.

Other objects and further features of the present invention will be apparent from the following detailed description when read in conjunction with the accompanying drawings.

BRIEF DESCRIPTION OF THE DRAWINGS

FIGS. 3A through 3C are drawings illustrating the arrangement of reception-purpose lenses and transmission-purpose lenses of the optical module;

FIGS. 7A through 7C are drawings illustrating the mounting position of the optical module with respect to the printed circuit board;

FIGS. 8A through 8C are drawings illustrating the MT ferrule connected to the optical module;

DESCRIPTION OF THE PREFERRED EMBODIMENTS

In the following, embodiments of the present invention will be described with reference to the accompanying drawings. In the specification and drawings, elements having substantially the same functions or configurations are referred to by the same numerals, and a duplicate description thereof will be omitted. In each drawing, the x axis represents the longitudinal direction of an optical module, and the y axis represents the width direction of the optical module, with the z direction representing the height direction of the optical module.

First Embodiment

1. Configuration of Optical Module

Figure 1A:
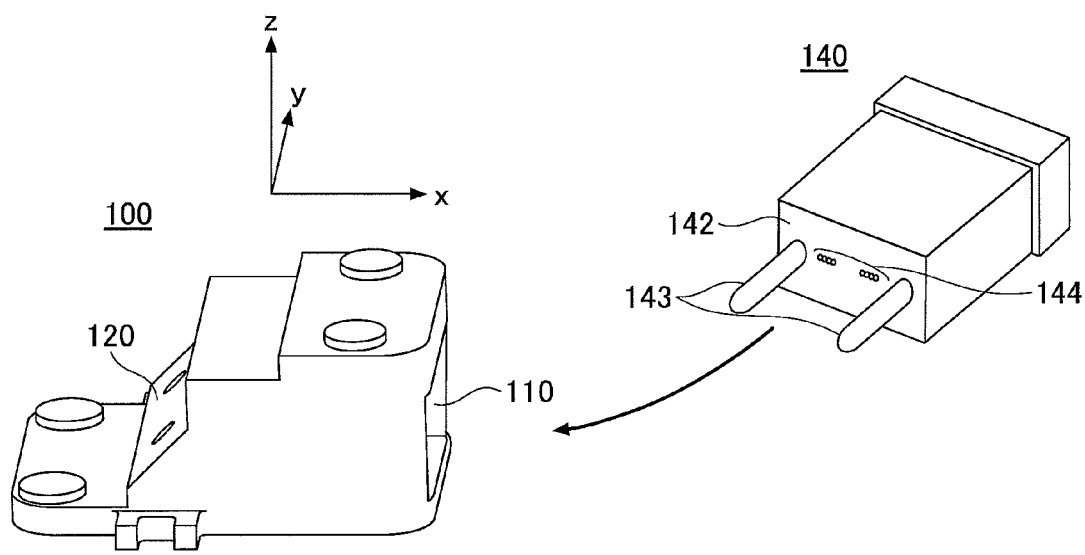
FIGS. 1A and 1B are perspective views of an optical module.
Figure 1B:
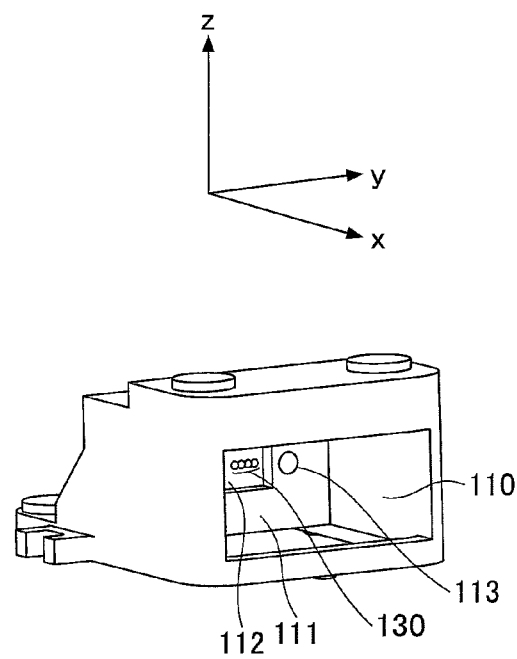

FIGS. 1A and 1B are perspective views of an optical module 100 according to a first embodiment. The main body of the optical module 100 is made of an olefin-based resin having the function to serve as a core material. In the present embodiment, the olefin-based resin constituting the optical module 100 has the following characteristics: refractive index >1.5 and transmittance >92% (or at least greater than 90%). Here, the term "main body" refers to the physical structure that constitutes the functional unit referred to as the "optical module". In the following, the term "main body" and the term "optical module" may be used interchangeably when there is no need to make a distinction therebetween.

As illustrated in FIG. 1A, the optical module 100 has an inner space for accommodating part of the MT (mechanical transfer) ferule 140. Optical fibers (not shown) and the MT ferule 140 are inserted into the space through an insertion opening 110 for connection with the optical module 100.

A mirror 120 is formed on a slanted face of the optical module 100 by a vapor deposition process that attaches vapor deposition material to the slanted face.

As illustrated in FIG. 1B, a contact face 111 is situated in the space at the far end from the insertion opening 110. The contact face 111 comes in contact with a front face 142 of the MT ferule 140 inserted into the insertion opening 110.

The contact face 111 has engagement holes 113 formed therein. The engagement holes 113 engage with pins 143 formed on the front face 142 of the MT ferule 140. The engagement holes 113 are formed in the contact face 111 such that the positions, sizes, and number thereof correspond to those of the pins 143. The MT ferule 140 illustrated in FIG. 1 has two pins 143, so that two engagement holes 113 are formed in the contact face 111.

The contact face 111 further has a recess 112 formed therein. The recess 112 is formed as a dent having a face situated further toward the negative x direction than the contact face 111. A lens group 130 is disposed in the recess 112. The lenses of the lens group 130 include reception lenses and transmission lenses.

The reception lenses are aspherical lenses that convert optical signals received from the optical fibers of the MT ferule 140 into parallel light. With this arrangement, the optical signals having propagated through the optical fibers travel inside the optical module 100 as parallel light. The use of aspherical lenses has an advantage in that the loss of optical signals are small.

The transmission lenses are aspherical lenses that concentrate optical signals having traveled inside the optical module 100 to allow the optical signals to enter the optical fibers.

The front face 142 has an orifice group 144 for transmitting and receiving optical signals. Optical signals having propagated through the optical fibers are transmitted from the orifices of the orifice group 144 to enter the reception lenses of the optical module 100. Optical signals transmitted from the transmission lenses of the optical module 100 enter the optical fibers through the orifices.

2. Internal Structure of Optical Module

Figure 2A:
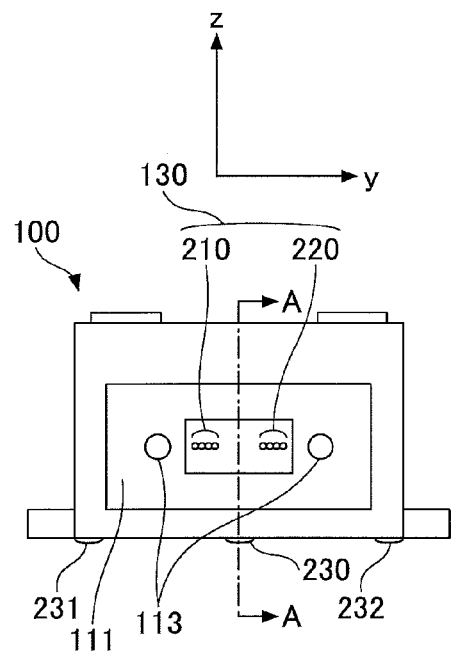
FIGS. 2A through 2C are drawings illustrating the internal structure of the optical module.
Figure 2B:
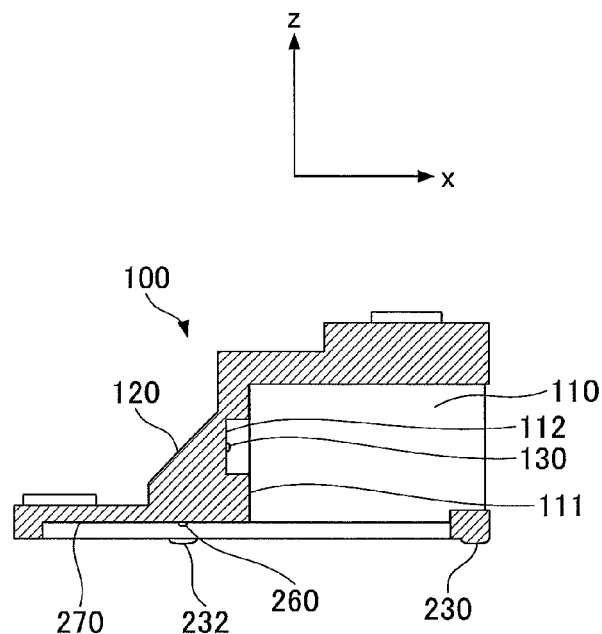
Figure 2C:
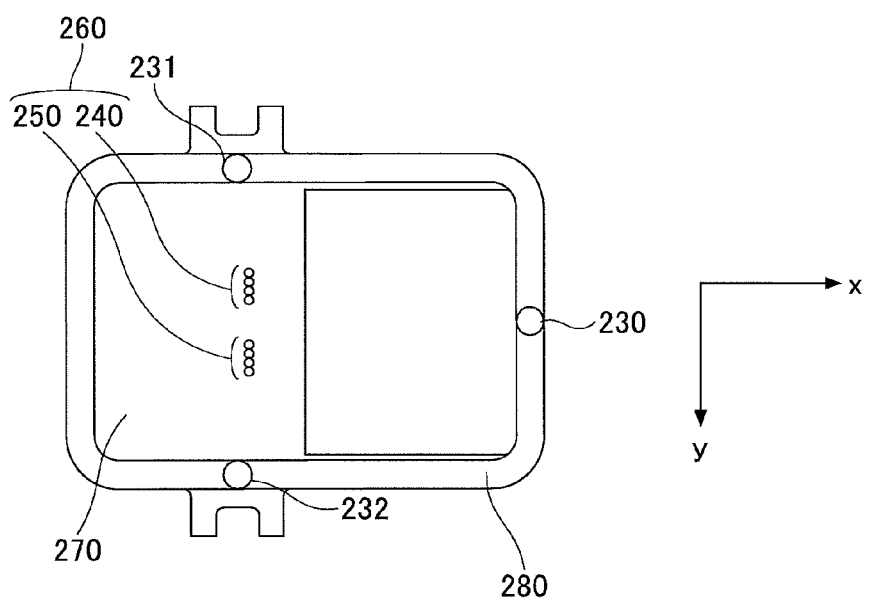

In the following, the structure of the optical module 100 will be described. FIGS. 2A through 2C are drawings illustrating the internal structure of the optical module 100.

FIG. 2A is a rear view of the optical module 100 as viewed from the positive x-axis direction. As illustrated in FIG. 2A, the lens group 130 includes lenses 210 and lenses 220, which are aligned in the y-axis direction in two sets each including four lenses. The optical module 100 enables the transmission and reception of optical signals for four channels. In the present embodiment, the lenses 210 serve as, and will hereinafter be referred to as, reception lenses. The lenses 220 serve as, and will hereinafter be referred to as, transmission lenses.

The engagement holes 113 are situated beside the opposite ends of the lens group 130, and extend in the x-axis direction. The pins 143 of the MT ferule 140 engage with the engagement holes 113, so that the MT ferule 140 inserted into the insertion opening 110 is secured to the optical module 100.

As illustrated in FIG. 2A, the optical module 100 has legs 230 through 232 that come in contact with a printed circuit board ("board") to support the optical module 100 mounted on the board.

FIG. 2B is a cross-sectional view of the optical module 100 taken along the line A-A in FIG. 2A. FIG. 2C is a view of the optical module 100 as viewed from a bottom face 270. As illustrated in FIGS. 2B and 2C, a lens group 260 is disposed on the bottom face 270 of the optical module 100.

As illustrated in FIG. 2C, a rim 280 is formed along the perimeter of the bottom face 270. The legs 230 through 232 are formed on the rim 280.

As illustrated in FIG. 2C, the lens group 260 include lenses 240 and lenses 250 which are aligned in the y-axis direction in two sets each including four lenses. In the present embodiment, the four lenses 240 are aspherical lenses which serve as lenses to concentrate and transmit optical signals having traveled inside the optical module 100, and will hereinafter be referred to as transmission lenses. The optical signals transmitted from the transmission lenses 240 enter photodetectors (not shown) that are disposed on the board and serve as photoelectric conversion devices for converting optical signals into electric signals. The four lenses 250, which are aspherical lenses, serve as lenses to receive optical signals transmitted from the VCSELs that are photoelectric conversion devices mounted on the board (not shown), and convert the received optical signals into parallel light that enters the optical module 100. It may be noted that VCSEL is an abbreviation of vertical cavity surface emitting laser. The optical signals received by the reception lenses 250 travel in the form of parallel light inside the optical module 100.

3. Positional Relationship Between Reception Lens and Transmission Lens

In the following, the relationship between the reception lenses and the transmission lenses will be described. FIGS. 3A through 3C are drawings illustrating the arrangement of the reception lenses 210 and the transmission lenses 240 and the arrangement of the reception lenses 250 and the transmission lenses 220 in the optical module 100.

FIG. 3A is a lateral cross-sectional view of the optical module 100 which is the same view as FIG. 2B. FIG. 3B is a cross-sectional view of the optical module 100 taken along the line B-B in FIG. 3A as viewed from the same side as the bottom face 270. FIG. 3C is an enlarged view of an area 300 shown in FIG. 3B in which the reception lenses 210 and the transmission lenses 220 are situated.

As illustrated in FIG. 3C, lenses 211 of the reception lenses 210 are in one-to-one correspondence with lenses 241 of the transmission lenses 240.

4. Mirror Angle and Optical Path

Figure 4A:
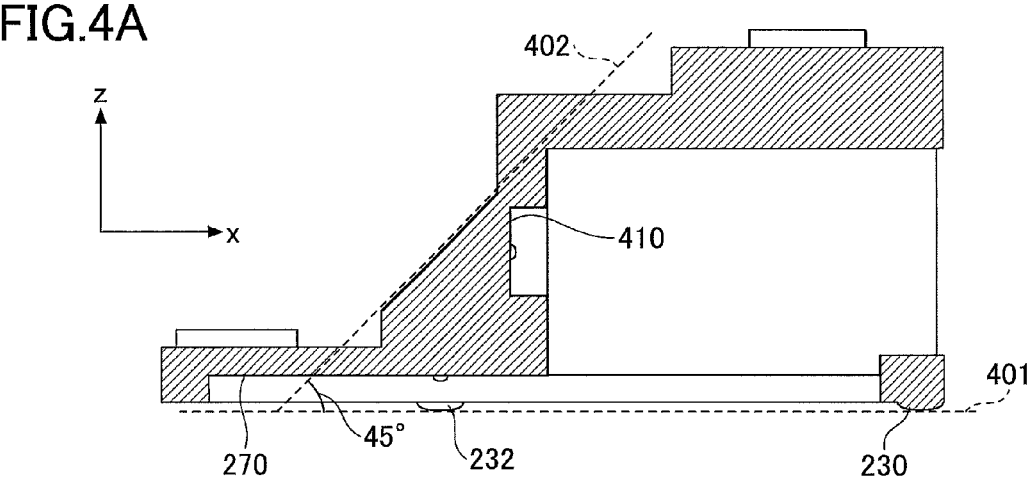
FIGS. 4A through 4C are drawings illustrating an angle of a mirror and optical paths of the optical module.
Figure 4B:
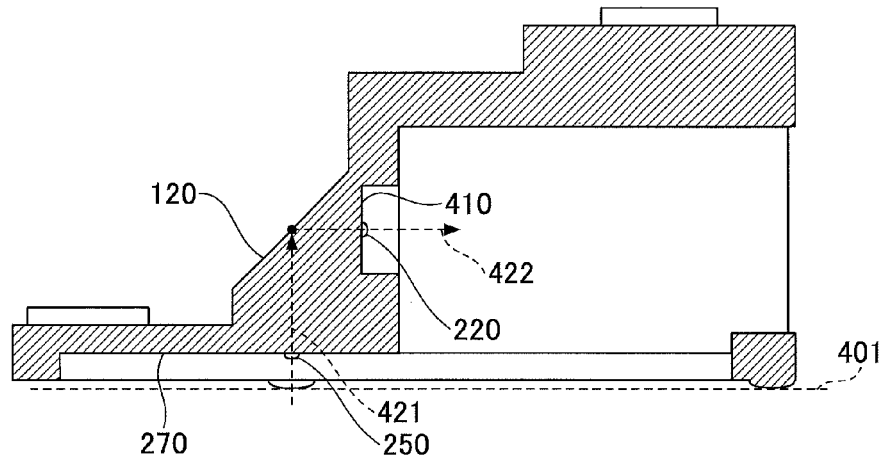
Figure 4C:
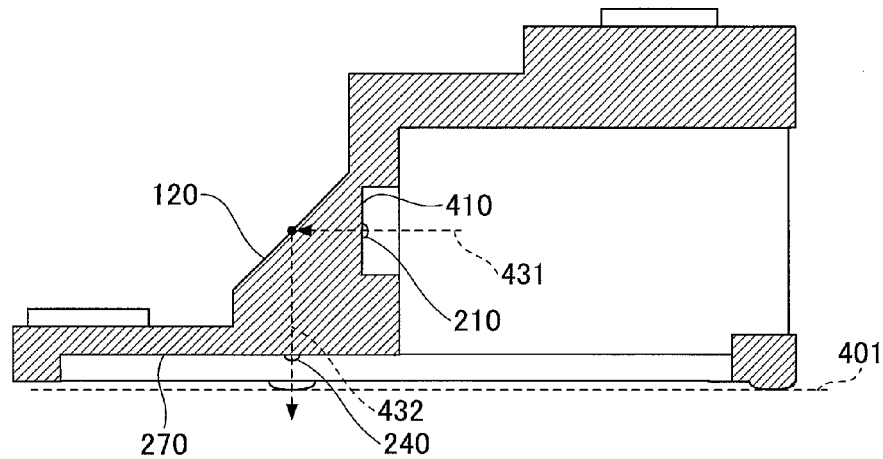

In the following, a description will be given of the mirror 120 of the optical module 100 and the optical paths along which optical signals travel inside the optical module 100. FIGS. 4A through 4C are drawings illustrating the mirror 120 and optical paths of the optical module 100.

In FIG. 4A, a plane 401 is coplanar to the tips of the legs 230 through 232. A slanted plane 402 includes the face on which the mirror 120 is formed and a coplanar extension thereof. As illustrated in FIG. 4A, the angle between the plane 401 and the slanted plane 402 is 45 degrees. The bottom face 270 and the plane 401 are parallel to each other. An end face 410 and the plane 401 are perpendicular to each other.

As illustrated in FIG. 4B, an optical signal 421 transmitted in the direction perpendicular to the plane 401 from the point directly below the reception lenses 250 travel inside the optical module 100 in the direction perpendicular to the bottom face 270, i.e., perpendicular to the plane 401. The optical signal 421 is then reflected by the mirror 120.

The slanted plane 402 on which the mirror 120 is formed is at a 45-degree angle to the plane 401, so that an optical signal 422 having reflected off the mirror 120 travels parallel to the plane 401. A center of the light ray of the optical signal 422 coincides with the center axis of a corresponding one of the transmission lenses 220. The reflected optical signal 422 is transmitted from the corresponding transmission lens 220.

Similarly, as illustrated in FIG. 4C, an optical signal 431 transmitted form the MT ferule 140 (not shown in FIG. 4C) in the direction perpendicular to the end face 410 travels through the reception lens 210 and inside the optical module 100 in the direction parallel to the end face 410. The optical signal 431 is then reflected by the mirror 120.

The reflected optical signal 432 travels in the direction perpendicular to the bottom face 270, and is then transmitted from a corresponding one of the transmission lenses 240.

As described above, the mirror 120 is disposed on the optical paths between the reception lenses 210 and the transmission lenses 240 and on the optical paths between the reception lenses 250 and the transmission lenses 220.

5. Method of Securing MT Ferrule

Figure 5A:
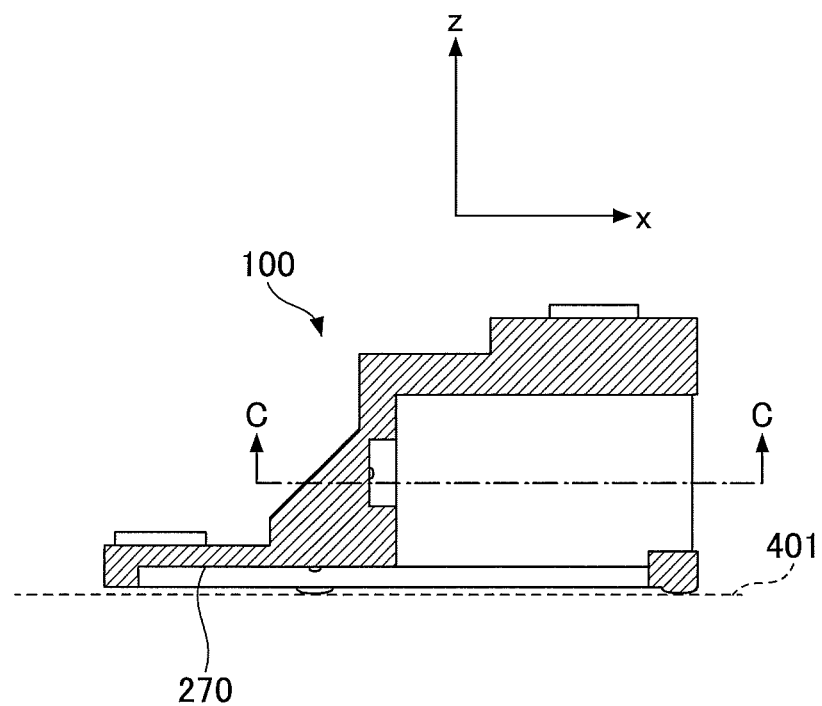
FIGS. 5A and 5B are drawings illustrating the arrangement of engagement holes of an MT ferrule.
Figure 5B:
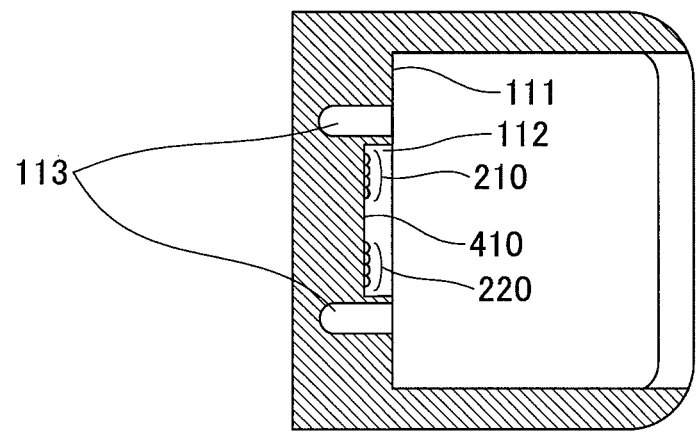

In the following, the method of securing the MT ferule 140 in the optical module 100 will be described. FIGS. 5A and 5B are drawings illustrating the method of securing the MT ferule 140 in the optical module 100.

FIG. 5A is a lateral cross-sectional view of the optical module 100. FIG. 5B is a cross-sectional view of the optical module 100 taken along the line C-C in FIG. 5A as viewed from the same side as the bottom face 270.

As illustrated in FIG. 5B, the engagement holes 113 are situated outside the recess 112, and extend in the direction perpendicular to the contact face 111 and parallel to the plane 401.

6. Optical Transceiver

Figure 6A:
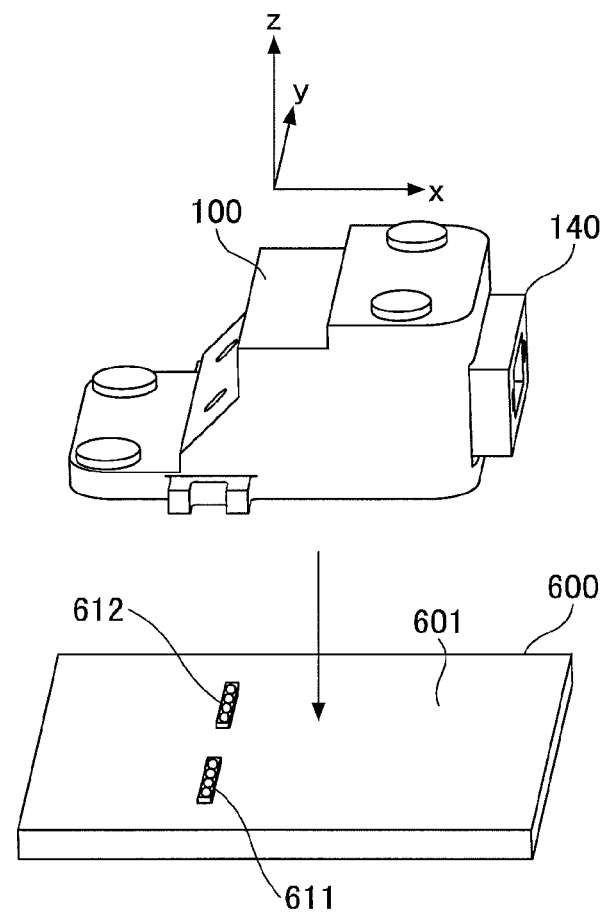
FIGS. 6A and 6B are drawings illustrating a configuration in which the optical module with the MT ferrule connected thereto is mounted on a printed circuit board.
Figure 6B:
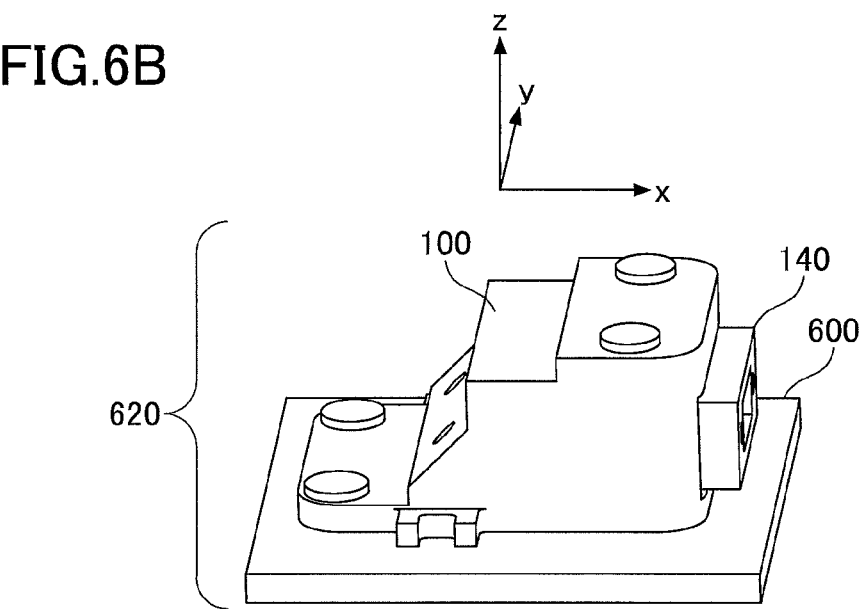

In the following, an optical transceiver that is made by mounting on a circuit board the optical module 100 with the MT ferule 140 connected thereto will be described. FIGS. 6A and 6B are drawings illustrating an optical transceiver.

As illustrated in FIG. 6A, a circuit board ("board") 600 has photo detectors 611 and VCSELs 612 mounted thereon. The photo detectors 611 detects optical signals incident at the right angle to a plane 601 of the board 600.

The optical module 100 is mounted on the board 600 such that the transmission lenses 240 are situated directly above the photo detectors 611 and the reception lenses 250 are situated directly above the VCSELs 612.

FIG. 6B illustrates an optical transceiver 620 that is formed by aligning and mounting the optical module 100 on the board 600, with the MT ferule 140 connected thereto.

FIGS. 7A through 7C are drawings illustrating the positional relationships between the photo detectors 611 and the transmission lenses 240 and the positional relationships between the VCSELs 612 and the VCSELs 612. FIG. 7A is a lateral cross-sectional view of the optical module 100.

FIG. 7B is a cross-sectional view of the optical module 100 taken along the line D-D in FIG. 7A as viewed from the same side as the bottom face 270. FIG. 7C is a rear view of the optical module 100 mounted on the board 600 as viewed from the positive x-axis direction.

As illustrated in FIG. 7B, the optical module 100 is aligned in the x-axis direction and in the y-axis direction such that the positions of the VCSELs 612 coincide with the positions of the reception lenses 250. Further, the positions of the photo detectors 611 coincide with the positions of the transmission lenses 240.

It may be noted that the height of the legs 230 through 232 are defined such that the VCSELs 612 and the photo detectors 611 fit within a space between the board 600 and the bottom face 270.

7. Positional Relationship Between Optical Module and MT Ferrule

The positional relationship between the optical module 100 and the MT ferule 140 will be described. FIGS. 8A through 8C are drawings illustrating the positional relationship between the optical module 100 and the MT ferule 140. FIG. 8A is a lateral cross-sectional view of the optical module 100 with the MT ferule 140 connected thereto. FIG. 8B is a cross-sectional view of the optical module 100 taken along the line B-B in FIG. 8A as viewed from the same side as the bottom face 270. FIG. 8C illustrates the pins 143 engaged in the engagement holes 113.

As illustrated in FIG. 8B, the front face 142 of the MT ferule 140 is in contact with the contact face 111 that has the recess 112 formed therein. The lens group 130 is disposed on the end face 410. With this arrangement, there is a space between the lens group 130 and the front face 142. Namely, the front face 142 does not come in direct contact with the lens group 130 when the MT ferule 140 is connected to the optical module 100.

The pins 143 are engaged in the engagement holes 113 when the MT ferule 140 is connected to the optical module 100. Engagement of the pins 143 in the engagement holes 113 serves to secure the MT ferule 140 in the optical module 100.

8. Production Steps

Figure 9A:
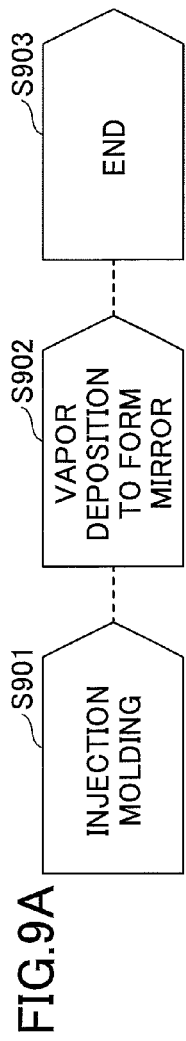
FIGS. 9A and 9B are drawings illustrating production steps for optical modules.
Figure 9B:
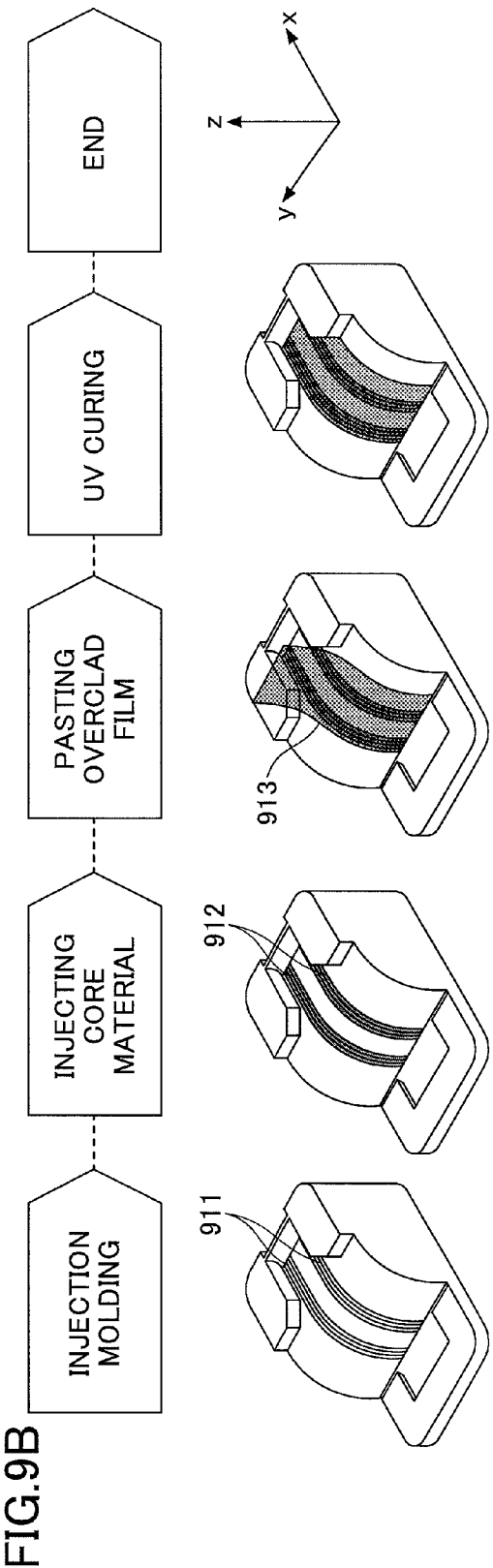

In the following, production steps for the optical module 100 will be described. FIGS. 9A and 9B are drawings illustrating the steps for making an optical module. FIG. 9A is a drawing illustrating the steps for making the optical module 100 of the present embodiment. FIG. 9B is a drawing illustrating a comparative example of the steps for making an optical module.

The optical module 100 of the present embodiment is made by injection molding (S901). At least the following parts are integrally molded:
i) the legs 230 through 232;
ii) the slanted plane 402;
iii) the reception lenses 250 and the transmission lenses 240; and
iv) the reception lenses 210 and the transmission lenses 220.

Further, vapor deposition is performed with respect to the slanted plane 402 (S902) to form the mirror 120. With this, the production process of the optical module 100 comes to an end (S903).

In the case of the optical module illustrated in FIG. 9B, grooves 911 for forming optical waveguides are filled with core material 912 after the injection molding. An overclad film 913 is then pasted on the grooves 911 filled with the core material 912, followed by a UV curing process.

As can be seen from the comparison of FIG. 9A with FIG. 9B, the number of components is smaller in the optical module 100 of the present embodiment, thereby enabling the reduction of production steps. Although vapor deposition is performed in the example illustrated in FIG. 9A, a vapor deposition process may be omitted as long as an arrangement is made such as to cause an optical signal to have a total reflection on the slanted plane 402. Without a vapor deposition, however, dirt on the slanted plane 402 causes light loss to occur at the reflection surface. Vapor deposition on the slanted plane 402 is thus preferably performed in order to prevent such light loss to occur.

To cause an optical signal traveling inside the optical module 100 to have a total reflection on the slanted plane 402, the optical module 100 may be made of a material having a refractive index higher than 1.5, for example.

9. Loss of Optical Signal

Figure 10A:
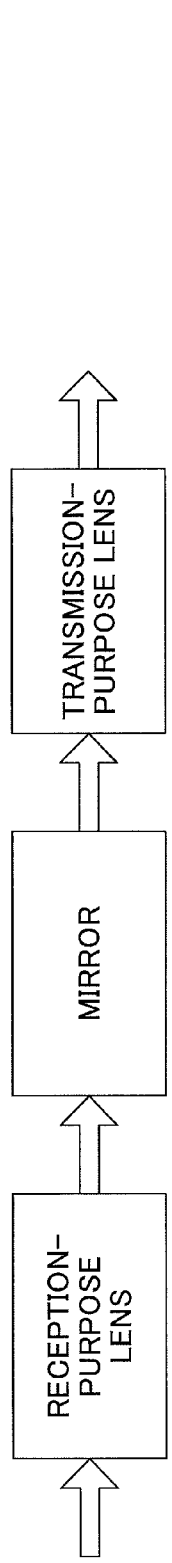
FIGS. 10A and 10B are drawings illustrating the loss of an optical signal.
Figure 10B:
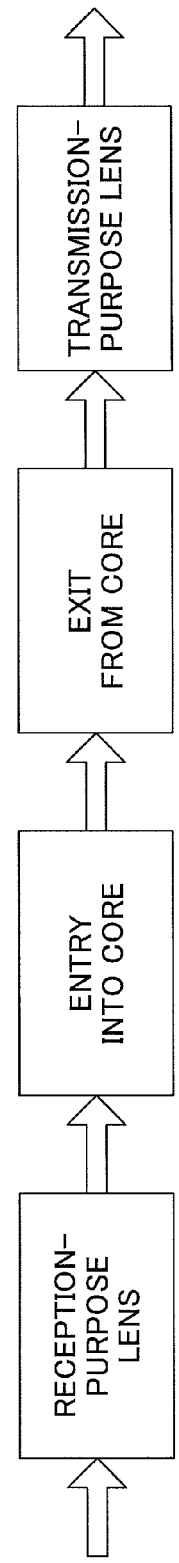

In the following, the loss of optical signals associated with the propagation of optical signals through the optical module is described. FIGS. 10A and 10B are drawings illustrating the loss of optical signals propagating through the optical module. FIG. 10A is a drawing schematically illustrating the path of an optical signal inside the optical module of the present embodiment. FIG. 10B is a drawing schematically illustrating the path of an optical signal inside the optical module of the comparative example.

As illustrated in FIG. 10A, the optical module 100 of the present embodiment has three points at which the loss of an optical signal may occur. The loss of an optical signal may occur at the point at which the optical signal having propagated through an optical fiber enters the optical module 100 through the reception lens 210. Further, the loss of an optical signal may occur at the point at which the optical signal reflects off the mirror 120. Moreover, the loss of an optical signal may occur at the point at which the reflected optical signal exits from the transmission lens 240.

It may be noted that the same applies in the case in which an optical signal from the VCSEL 612 enters the reception lens 250. Namely, the loss of an optical signal may occur at the point at which the optical signal enters the reception lens 250. Further, the loss of an optical signal may occur at the point at which the optical signal propagating inside the optical module 100 reflects off the mirror 120. Moreover, the loss of an optical signal may occur at the point at which the reflected optical signal exits from the transmission lens 220.

On the other hand, the optical module illustrated in FIG. 10B has four points at which the loss of an optical signal occurs. The loss of an optical signal occurs at the point at which the optical signal having propagated through an optical fiber enters the optical module through a reception lens. Further, the loss of an optical signal occurs at the point at which the optical signal exiting from the reception lens enters the core material 912 filling a groove. Further, the loss of an optical signal occurs at the point at which the optical signal exits from the core material 912. Moreover, the loss of an optical signal occurs at the point at which the optical signal having exited from the core material exits from a transmission lens.

According to the optical module 100 of the present embodiment, the number of points at which the loss of an optical signal may occur is reduced compared to the optical module of FIG. 10B, thereby suppressing the total amount of optical signal loss. For example, the loss of an optical signal in the optical module 100 of the present embodiment may be suppressed to approximately 4.5 dB whereas the loss of an optical signal in the optical module of FIG. 10B may be approximately 6 dB.

10. Summary

As is apparent from the descriptions provided heretofore, the optical module of the present embodiment has a mirror formed on a face that is at an angle to the plane on which the optical module is mounted. Further, the lenses and the slanted face are integrally molded with the main body by injection molding.

In the present embodiment, the angle between the slanted plane 402 and the plane 401 is 45 degrees, and the refractive index of the material of the module is more than or equal to 1.5.

The arrangements described above obviate the needs for some materials (i.e., the core material, the overclad material, etc.) that would otherwise be used in the making of an optical module. As a result, the production steps are simplified compared to the conventional optical module. Further, the loss of an optical signal is suppressed compared to the conventional optical module.

Second Embodiment

In the first embodiment, aspherical lenses are used as the reception lenses 210 and 250 and the transmission lenses 220 and 250. Alternatively, spherical lenses may be used. The use of spherical lenses has an advantage in that the making thereof is easy and inexpensive.

According to at least one embodiment, production steps for making an optical module are reduced, and, also, light loss is reduced.

The present invention is neither limited to the configurations described in the embodiments described above nor limited to combinations of these embodiments with or without additional elements. Various variations and modifications may be made without departing from the scope of the present invention, and may be designed in consideration of practical application.

The present application is based on and claims the benefit of priority of Japanese priority application No. 2015-187410 filed on Sep. 24, 2015, with the Japanese Patent Office, the entire contents of which are hereby incorporated by reference.

What is claimed is:

1. An optical module for connecting between an optical fiber and a photoelectric conversion device mounted on a printed circuit board, comprising:
a main body made of transmissive material and having a slanted face and a bottom face, the slanted face being at an angle to the bottom face;
a first lens formed on the main body; and
a second lens formed on the main body,
wherein the slanted face serves as a mirror situated on an optical path extending in the main body, the optical path extending from the first lens to the mirror and further extending from the mirror to the second lens, the mirror being situated between the first lens and the second lens along the optical path, and
wherein the main body has an insertion hole configured to receive therein at least a part of a mechanical transfer ferrule, and has a contact face situated at a back end of the insertion hole, the contact face being configured to come in contact with a front face of the mechanical transfer ferrule.

2. The optical module as claimed in claim 1, wherein the main body and at least one of the first lens and the second lens are formed seamlessly with each other as a continuous unitary structure by injection molding.

3. The optical module as claimed in claim 1, wherein the main body has a recess in the contact face at the back end of the insertion hole, the first lens being disposed in the recess.

4. The optical module as claimed in claim 1, further comprising material disposed on the slanted face through vapor deposition.

5. A method of making an optical module for connecting between an optical fiber and a photoelectric conversion device mounted on a printed circuit board, comprising:

forming, by injection molding of transmissive material, a seamless structure including a first lens, a second lens, and a main body having a slanted face situated at an angle to a bottom face of the main body; and arranging for the slanted face to serve as a mirror situated on an optical path extending in the main body, the optical path extending from the first lens to the mirror and further extending from the mirror to the second lens, the mirror being situated between the first lens and the second lens along the optical path, wherein the main body has an insertion hole configured to receive therein at least a part of a mechanical transfer ferrule, and has a contact face situated at a back end of the insertion hole, the contact face being configured to come in contact with a front face of the mechanical transfer ferrule.

* * * * *